June 25, 1935.                 C. FIELD                 2,005,735
                                ICE
                Original Filed July 14, 1928    5 Sheets-Sheet 4
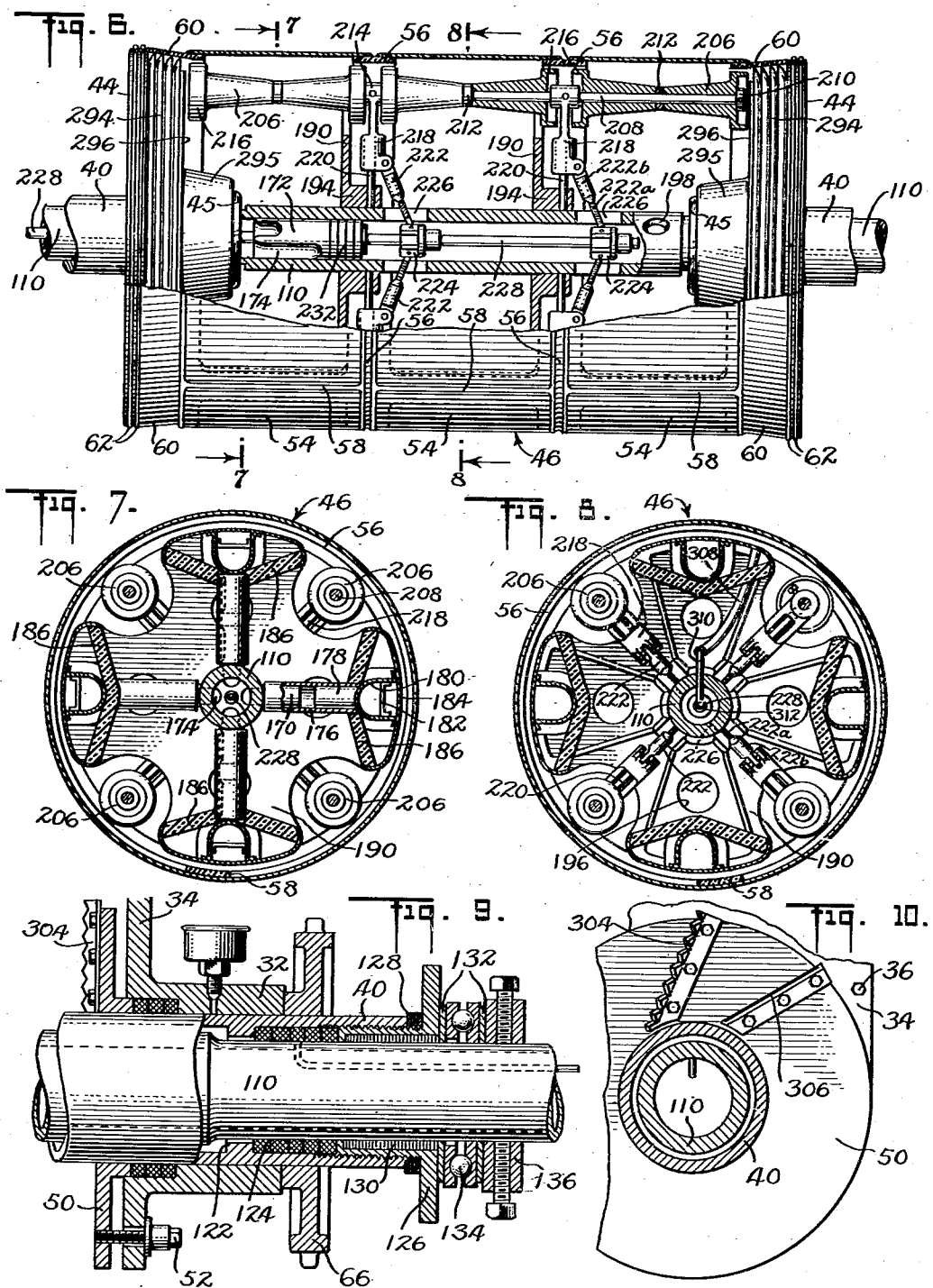
INVENTOR
Crosby Field
BY
ATTORNEYS June 25, 1935.  C. FIELD  2,005,735
ICE
Original Filed July 14, 1928  5 Sheets-Sheet 5
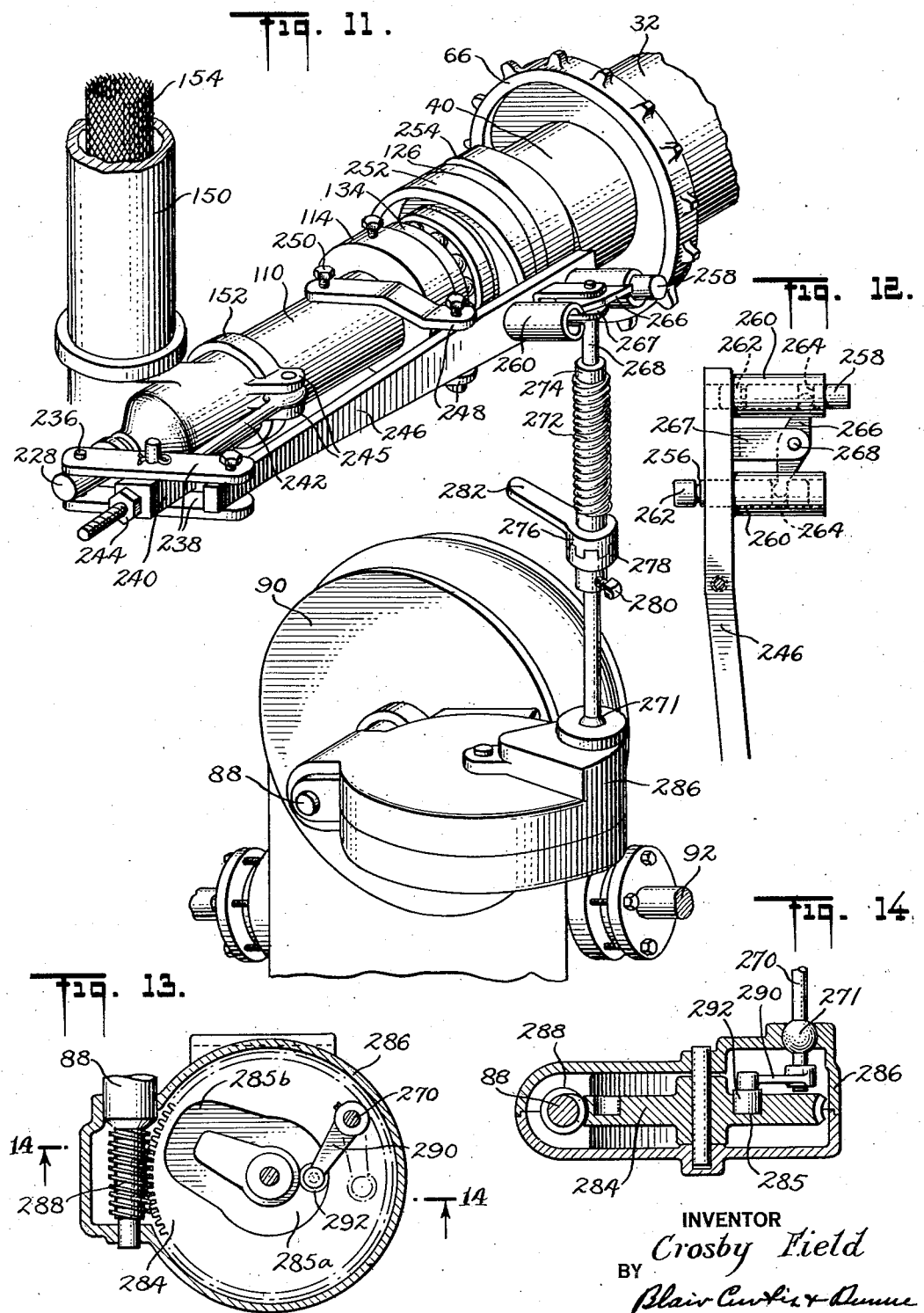
INVENTOR
Crosby Field
BY
Blair Curtis & Dunne
ATTORNEYS Patented June 25, 1935

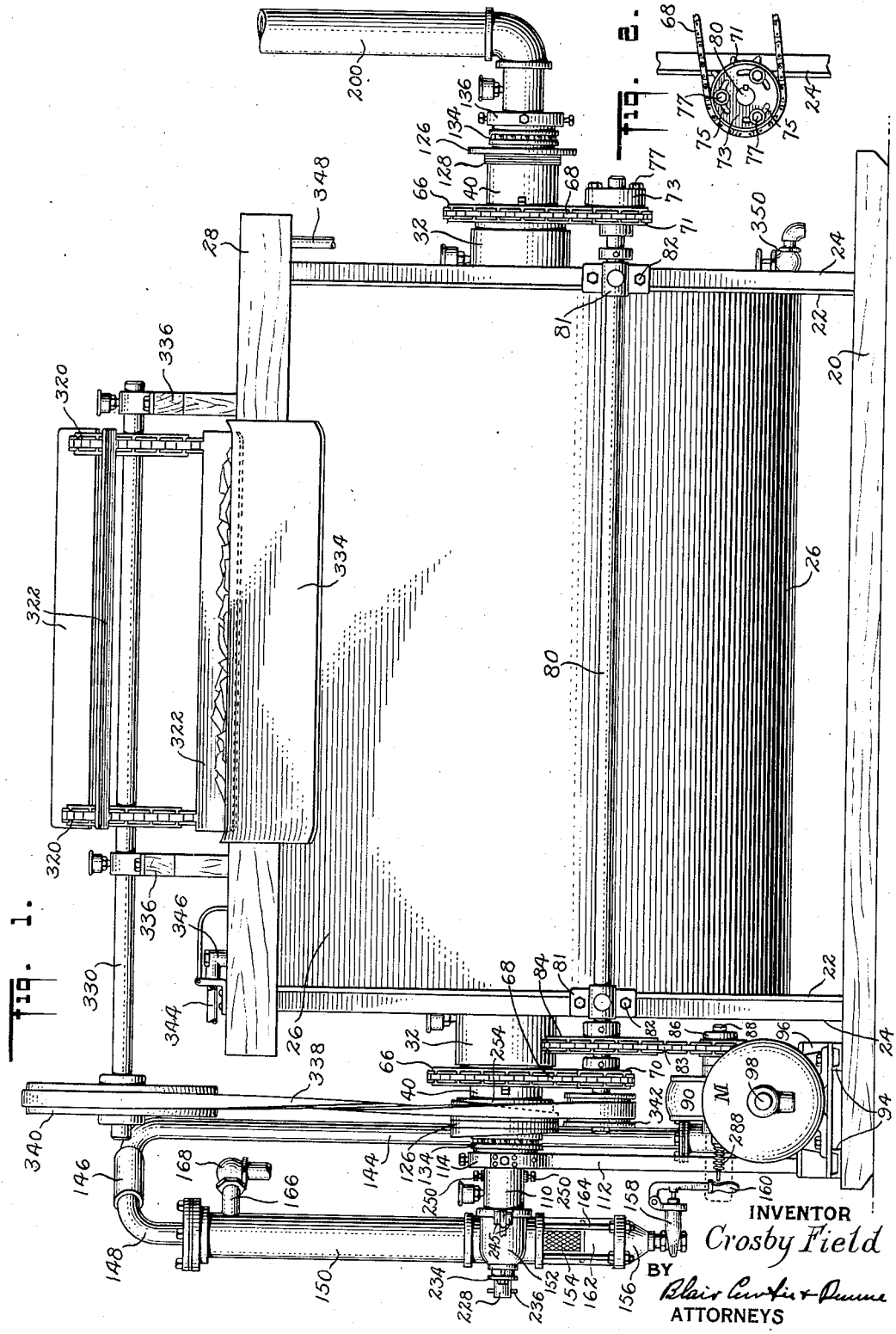

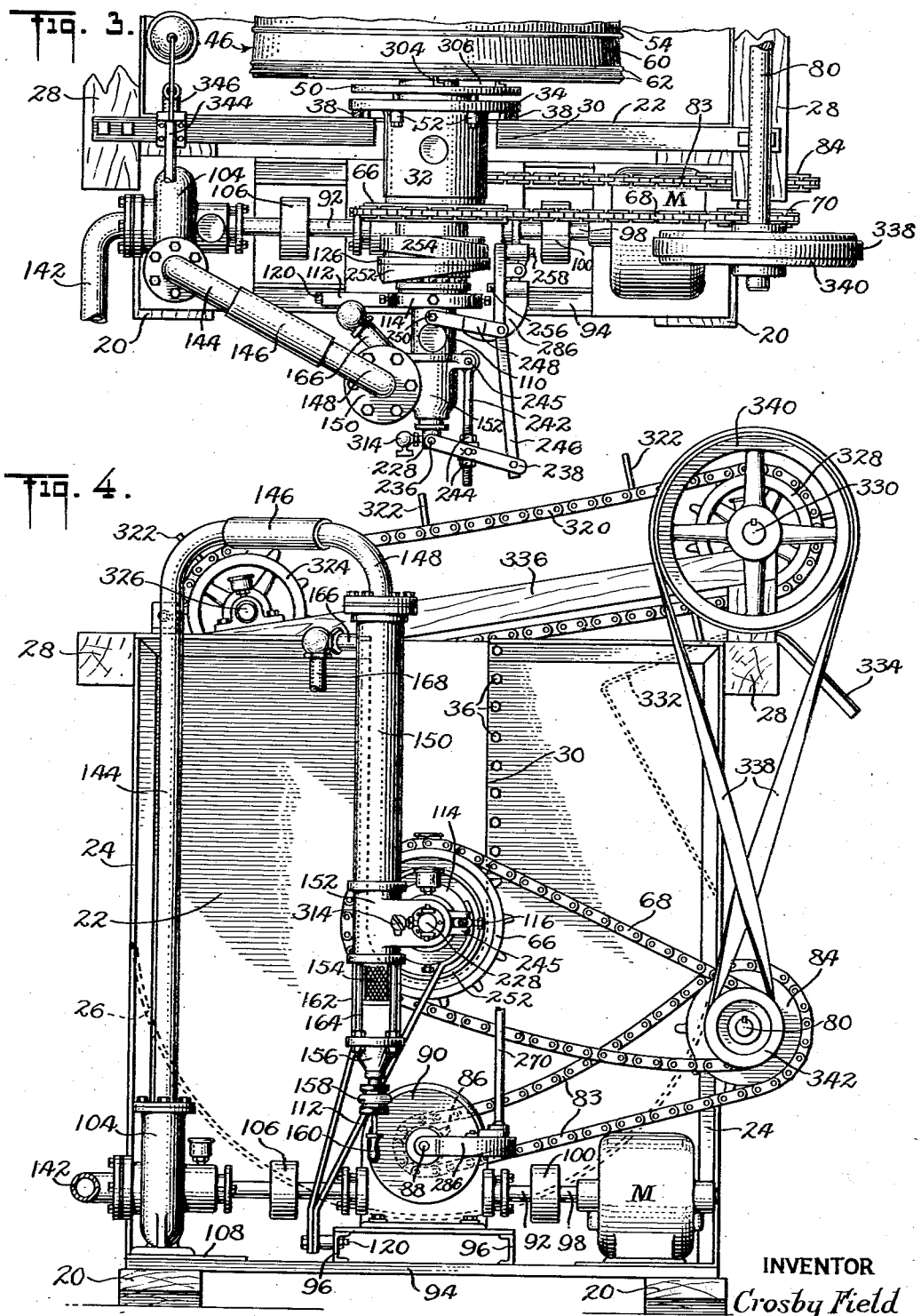

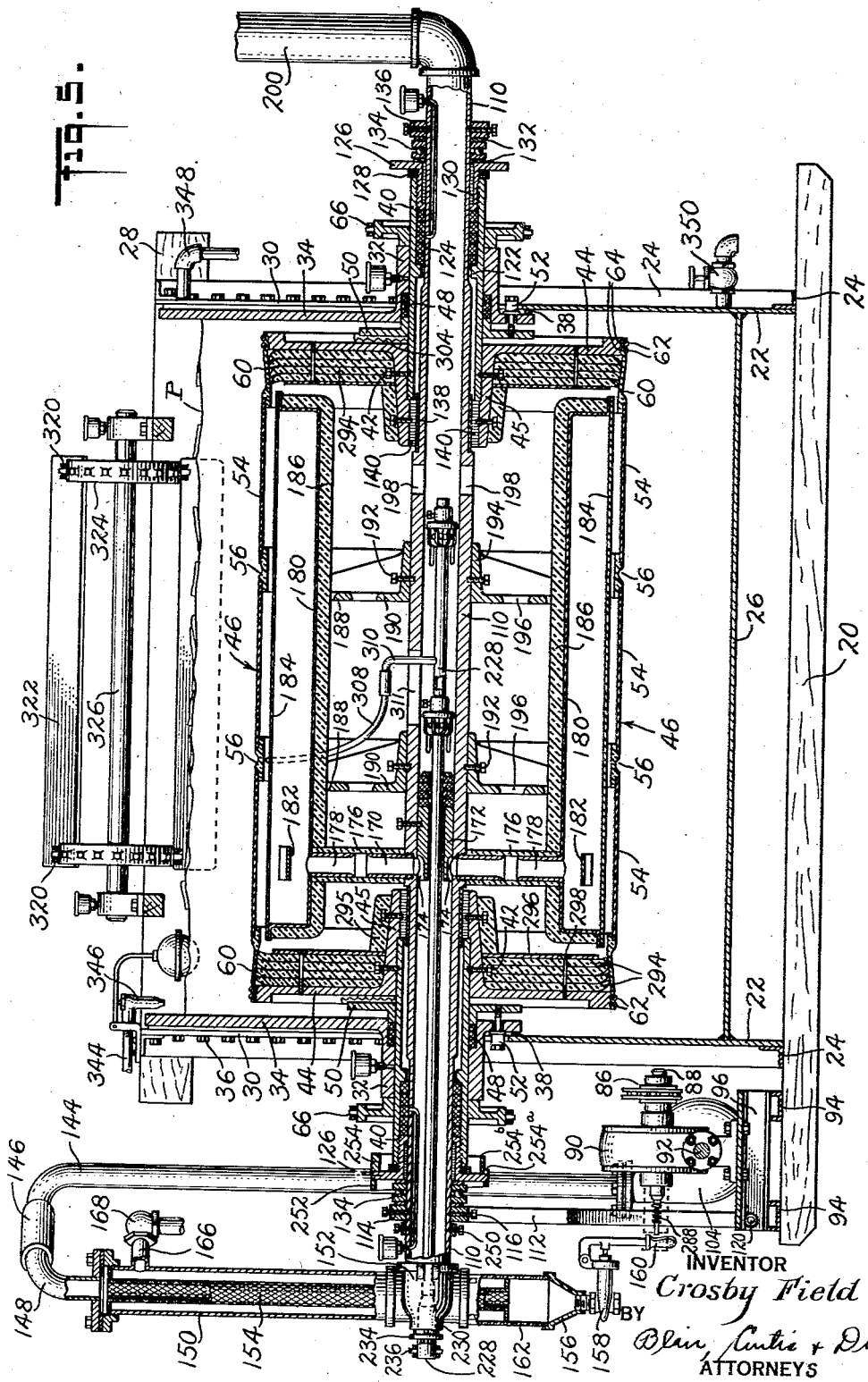

2,005,735

UNITED STATES PATENT OFFICE 2,005,735

ICE

Crosby Field, Brooklyn, N. Y., assignor, by mesne assignments, to Flakice Corporation, Wilmington, Del., a corporation of Delaware Original application July 14, 1928, Serial No. 292,631. Divided and this application July 11, 1933, Serial No. 679,864. In Canada July 9, 1929

12 Claims. (Cl. 62—105)

This invention relates to a method of manufacturing and an apparatus for manufacturing congealed fluids, and to the product produced by said method, illustrated in the following description of the structure and operation of a heat exchange apparatus of the type in which a coating of brittle material is formed upon and subsequently removed from a deformable member through which the exchange of heat occurs for causing the brittle material to form thereon. In its present employment the invention relates also to ice-making apparatus wherein the ice is formed upon a thin flexible sheet, such as a cylinder, which is subsequently flexed to cause cracking and/or peeling of the ice therefrom. In my patents, Numbers 1,451,901 and 1,451,903 granted April 17th, 1923, there are shown certain forms of cylindrical ice-making apparatus which have proved satisfactory for their intended purposes. It is an object of the present invention to provide improved process and apparatus of this type which will be more particularly suitable for exacting commercial operating requirements and which is usable to produce a product superior to that produced by the machines disclosed in said patents.

This application is a division of my co-pending application Serial No. 292,631, filed July 14, 1928.

The nature and further obects of the invention will be apparent to those skilled in the art from the following description and accompanying drawings of one illustrative embodiment of such apparatus.

In the drawings:

Figure 1 is a side elevation of such a machine assembled, certain parts included in the cylinder deflecting mechanism being omitted but shown in their proper relationship in other views:

Figure 2 is an end elevation of a detail shown at the right end of Figure 1;

Figure 3 is a partial plan view of the left end of the assembly;

Figure 4 is a left end elevation, based on Figure 1;

Figure 5 is a longitudinal central vertical section;

Figure 6 is an axial section through the cylinder taken principally on the line 6—6 of Figures 7 and 8;

Figure 7 is a transverse vertical section taken on the line 7—7 of Figures 5 and 6;

Figure 8 is a transverse vertical section taken on the line 8—8 of Figures 5 and 6;

Figure 9 is an enlarged vertical section of the bearing shown on the right of Figure 5;

Figure 10 is a transverse vertical section taken on the line 10—10 of Figure 9;

Figure 11 is an enlarged perspective view of the cylinder deflecting mechanism;

Figure 12 is another enlarged view showing in plan certain details found in the right upper corner of Figure 11;

Figure 13 is a horizontal section through the gear case found in the lower portion of Figure 11; and Figure 14 is a vertical section taken on the line 14—14 of Figure 13.

The present apparatus in general comprises a thin flexible cylinder journaled for rotation within a vessel filled with enough water to cover the cylinder. By the term "cylinder" as herein used, I refer to that connotation which defines a cylinder as generated by a line travelling about any closed curve and constantly remaining parallel to itself, in contradistinction to that connotation which limits the cylinder to one generated by a line moving about a circle and remaining parallel to itself. Brine or any other suitable refrigerating medium is circulated through the interior of the cylinder and forced in jets against its inner surface causing ice to form very rapidly upon its outer surface. At a predetermined time the thin flexible walls of the cylinder may be deflected by suitable mechanism progressively to alter the normal radius of curvature, which peels the ice sheet therefrom and permits a new layer to be formed directly thereon. The ice peeled from the cylinder floats to the surface of the water where it is removed.

Such apparatus avoids the necessity of freezing through a thick wall of initially formed ice as well as the necessity of employing heat for the removal of the ice when formed which are incident to the usual block freezing apparatus and thus obviously accelerates and reduces the cost of production.

As will be hereinafter described I may also operate my apparatus to permit "under-flow" or "freezing-under", as described in my Patent No. 1,480,382, whereby the freezing is further accelerated. With this mode of operation the walls of the cylinder are preferably constantly maintained in a deflected condition.

*Foundation and tank*

At the bottom of Figures 1 and 4 are shown foundation skids 20, 20 which support the entire machine. An open-topped tank (see also Figure 5) is supported upon these skids through its vertical end walls 22, 22 which are reinforced along their marginal edges by angle bars 24. To the inner facing sides of these end walls, there is secured as by brazing or welding a U-shaped sheet 26, the bottom of which is curved to conform generally to the shape of the cylinder to be placed therein and to avoid angular corners which would be difficult to keep clean. The top horizontal edges of the sheet 26 are strengthened by longitudinal beams 28, 28.

Removable cylinder assembly

As shown most clearly in Figures 3, 4 and 5, the end walls 22 of the tank are cut away from their top edges and between their side edges (the top angle bars also being cut) to provide open U-shaped slots 30, 30 for the reception of bored hubs 32, 32 formed integral with the vertically extending bearing supporting plates 34, 34. The plates 34 are larger than the slots 30 so as to overlap the side and bottom edges thereof and are secured against the interior faces of the end walls 22 by cap screws 36. Interposed between the tank end walls and the bearing supporting plates are gaskets 38 which may be in the form of rubber tubing to prevent leakage.

Referring to Figure 5, these hubs 32 form surrounding bearings for hollow stub shafts 40, 40 attached at their inner ends as by set screws 42 to the hubs 45 of disc-shaped heads 44, 44 which close the ends of and rotatably support a cylinder of thin flexible material generally indicated by the numeral 46. The space between each shaft and its bearing may be sealed by packing 48 placed in an annular recess in the bearing hub and held by a flanged packing gland 50 adjustably secured to the bearing plate 34 by set screws 52.

Cylinder construction

As shown in Figures 5 and 6, the cylinder, for various constructional and operating desiderata, is preferably made up of a plurality of thin edge-to-edge arranged sheets 54 of a metal having substantial flexibility and strength which are secured together by interior circumferential strips 56 of fabric-reinforced rubber and a longitudinal strip 58 of the same material. The outer ends of the cylinder thus formed are provided with other fabric-reinforced rubber aprons 60 which are secured to the heads 44 by wire strands 62 wound over the thin ends of the aprons 60 to bind them into circumferential grooves 64 formed in the heads. The strips 56 and the end aprons 60 are considerably thickened beneath the metal sheets for the dual purpose of providing heat insulation to prevent formation of ice beneath the edges of the metal sheets which would tend to separate the metal from the rubber and of providing tracks for cylinder deflecting rollers presently to be described.

Cylinder driving mechanism

As shown in Figures 1 and 5, the stub shafts 40 are equipped with sprocket wheels 66 fast thereon which are geared by sprocket chains 68 to sprocket pinions 70 and 71 mounted on a jack shaft 80 at the left and right ends respectively of the machine, the jack shaft being rotatably mounted in bearing boxes 81 fixed to the side of the tank by bolts 82.

The cylinder may be successfully driven from one end only but the provision of a drive sprocket for each end of the cylinder serves to equalize the driving torque on the cylinder and gives more satisfactory operation. Further to insure this equalization one of the sprockets—71 as shown in Figures 1 and 2—is made adjustable on the jack shaft 80. This is accomplished by mounting the sprocket 71 loosely on the shaft adjacent a fixed hub 73 and providing the sprocket with arcuate slots 75 which bolts 77 passing through holes in the hub 73 are adapted to enter to clamp the sprocket in various adjusted positions on the hub and jack shaft.

The jack shaft 80 may be driven, as shown at the left of Figure 1 and in Figure 4, by a sprocket chain 83 operating upon a sprocket 84 fast on the shaft 80 and another sprocket 86 fast on the low speed shaft 88 of a reduction gear train housed in the casing 90, the high speed shaft 92 of which is driven by a motor M. Both the motor and gear casing are mounted on transverse channel beams 94 supported on the skids 20, the base of the motor being mounted directly on the beams 94 while the gear casing is mounted on intermediate edge-supported channels 96 which, in turn, are carried upon the beams 94.

Preferably (Figure 4) the high speed shaft 92 of the gear train is connected to the motor shaft 98 by a flexible coupling 100. Conveniently, the other end of shaft 92 may be employed for operating a brine pump 104 through a similar flexible coupling 106, the pump also being supported upon the transverse beams 94 by a plate 108.

The parts thus far described are sufficient for the observation that if the cylinder is submerged in water filling the tank to some point P, indicated by a wavy line in Figure 5, ice will be formed from the water upon the outer surface of the cylinder if a cold-producing medium be circulated through the interior of the cylinder. And further, that since the cylinder is capable of rotation upon its own axis, the brine may be sprayed to all points along its interior surface by fixed nozzles if desired. The mechanism for circulating brine through the cylinder will now be described.

Brine circulating system

As shown in Figure 5, brine is led into and from the interior of the cylinder by a tube 110 extending from end to end through the cylinder 46 and its hollow shafts 40. This tube is held from rotation in any suitable manner as, for example (see the left side of Figure 5 and Figure 4) by a yoke 112 embracing and attached to a torque collar 114, at its upper bifurcated end and attached to a fixed part, for example one of the channels 96 supporting the gear casing 90, at its lower end by a bolt 120. The collar 114 may be secured to the tube 110 by set screws 116.

Provision is made for preventing leakage along the tube 110 both between the tube and the stub shafts 40 of the cylinder and between the tube and the interior of the hubs 45 of the cylinder heads 44. Since the parts at one end of the tube have counter-parts at the other end, only one end need be described.

Referring to the right end of Figure 5 and to Figure 9, the tube 110 is reduced within the hollow shaft 40 and the latter is provided with an internal annular rib 122 against which packing 124 is pressed by a gland 126 screwed into the outer end of the shaft. Fitted between the flange of the gland 126 and the end of the shaft 40 are shims 128 to furnish firm axial coordination between them since the flange has a further function in a thrust bearing assembly. In making adjustments on the packing, if a shim is removed from one side of the flange a shim of the same thickness is inserted on the other side to keep the bearing assembly in proper position.

The tube is further surrounded by a bearing bushing 130, preferably of lignum vitæ, set into an annular recess in the outer end of the packing gland 126. The bushing 130 is held by a washer 132 disposed on one side of a ball thrust bearing 134, the bearing at its other side acting through a similar washer 132 against a thrust collar 136 (at the left end, torque collar 114 already described serving the same purpose) rigidly secured to the tube.

Returning to Figure 5, within the hub 45 the tube 110 is provided with a bushing 138 of non-corrodible material, for example nickel, and the hub carries a lignum vitæ bearing bushing 140 closely fitting the nickel bushing and held to the hub by set screws or equivalent means.

Referring to Figures 3 and 4 and the left ends of Figures 1 and 5, cold brine is forced into the tube 110 by the pump 104 having an intake pipe 142 and a discharge pipe 144. The discharge pipe 144 extends upwardly from the pump and is bent at its upper end to connect with a flexible coupling 146, which, in turn, connects with an elbow 148 attached to the upper end of an enlarged stand-pipe 150. The stand-pipe includes and is supported by a T-coupling 152 threaded upon the open end of the tube 110. Brine flowing into the stand-pipe enters a concentric strainer 154 (Figure 5) and flows through it into the surrounding annular space and thence into the tube 110.

The lower end of the stand-pipe is closed by a cap 156 provided with a quick-throw dump valve 158 having a handle 160 for discharging collected sediment. If desired the portion of the stand-pipe below the T-coupling may include a transparent glass cylinder 162 for visual determination of the amount of sediment collected. The glass cylinder may be held between the T-coupling and the cap 156 by clamp bolts 164 which serve also to protect the glass against breakage.

It is desirable to maintain a sufficient brine pressure within the cylinder 46 so that it cannot be collapsed by the hydro-static pressure of the water normally contained in tank 26. Normally when the machine is in operation and the pump is working sufficient pressure is maintained within the cylinder but since the pump preferably employed is of the centrifugal type there may be a back-flow of liquid therethrough when the pump is not working. This back-flow would create a siphon to draw brine from the cylinder if no means were provided to permit air to flow into the upper part of the brine supply line including the elbow 148, the flexible coupling 146 and the upper portion of the pipe 144. For the purpose of preventing formation of such a siphon the stand-pipe 150 near its upper end is provided with a short pipe 166 equipped with an inwardly opening check valve generally indicated by the numeral 168. The check valve is designed to open and permit the inflow of air whenever the pressure within the stand-pipe 150 becomes less than atmospheric. Thus the brine cannot be withdrawn from the cylinder 46 to a level lower than the pipe 166 if the discharge stand-pipe at the other end of the machine to be described hereinafter is as high as the pipe 166.

It is evident from the foregoing description that stationary tube 110 extending co-axially through the working cylinder constitutes the means for the feed and discharge of brine therefrom; that this tube is carefully sealed from surrounding parts both to prevent leakage and to prevent formation of ice at undesired points; that brine is supplied to the left end of the tube through a strainer by a pump operated by the motor through a flexible shaft; and that the pipe 166 equipped with valve 168 prevents the siphoning of brine from the cylinder. Overflow from the upper end of the discharge stand-pipe presently to be described prevents the building up of excess pressure within the cylinder. An explanation will now be given of the manner in which brine from the central tube is sprayed against the interior surface of the rotating cylinder and the spent brine removed from the cylinder.

At the left central portion of Figure 5 and in Figure 7 the tube 110 is seen to be provided with four circumferentially spaced threaded holes for the reception of four nipples 170 and the tube is closed immediately beyond these holes by a plug 172 which is formed with end-opening recesses 174 positioned beneath the holes in the tube for dividing the incoming supply of brine into four equal streams flowing through the nipples 170 to four circumferentially spaced points within the cylinder.

Each tube nipple 170 is connected by a flexible heat insulating sleeve 176 with a trough nipple 178 formed integral with or rigidly secured to the bottom of a metal trough 180 closed at its ends and extending longitudinally along the greater part of the length of the cylinder.

Opposite the end of the nipple 178 is secured a baffle plate 182 for deflecting along the trough the brine flowing from the nipple.

Closing the outer open side of the trough 180 is a foraminous metal plate 184, the greater portion of the surface of which is formed on the arc of a circle of smaller radius than the normal radius of the cylinder. A spray or jet of brine is intended to be projected through the small holes of the foraminous plate against the interior surface of the cylinder, hence the plate is located closely adjacent thereto but sufficiently distant to permit the normal curvature of the cylinder to be altered to the desired extent for peeling ice therefrom. When positioned close to the cylinder the plates are capable of forming supports for the cylinder to prevent injury thereto in case for any reason the cylinder should collapse.

Desirably each trough may be partially covered by a heat insulating back 185 attached to the curved outer edges of the plate 184. This back may be formed of felt if suitably strengthened as by a wire screen of non-corrodible material. The entire spray trough assembly is supported in peripheral notches 188 of spaced spiders 190, 190, fastened upon the tube 110 by set screws 192 passing through their hubs 194, the spiders being provided with a plurality of apertures 196 for the free circulation of spent brine through the cylinder.

Spent brine escapes from the cylinder into the right hand end of the tube 110 by way of discharge openings 198 formed therein and flows from the end of the tube into a discharge stand-pipe 200, the latter emptying into any suitable disposal system, for example, a recooling system (not shown) supplying the intake pipe 142 of the brine pump 104, care being taken that undue back pressure will not be created in the stand-pipe and that a siphon will not be formed which might drain all of the brine from the cylinder.

Mechanism for deflecting the cylinder to peel ice therefrom

It is clear from the foregoing description that the cylinder rotates past the jets of cold brine issuing from the small holes in the spray plates 184 which causes a continuous layer of ice to form on the metal sheets of the cylinder. This ice formation clings to the cylinder with great tenacity so long as the cylinder retains its normal shape but is readily removed in sheets or flakes which float to the surface of the water in the tank if the cylinder is deflected sufficiently from its normal shape. Means is herein provided for producing a substantially uniform deflection of the cylinder across its entire width, and this means is so designed that the deflection may occur in timed relationship with the operation of the cylinder for producing ice flakes of predetermined thickness, it being understood that the deflection of the cylinder may be so controlled as to break the ice and free it completely from the cylinder or so as merely to cause local separation between the ice and the cylinder so as to permit under-flow or under-freezing as disclosed in my Patent No. 1,480,382, granted January 8, 1924.

As described in the above-mentioned patent, under-flow or under-freezing refers to the method of freezing ice which consists in separating an ice sheet or strip formed on a freezing surface from the freezing surface and allowing liquid being frozen to enter into the space between the sheet and freezing surface so that immediate transfer of heat from the liquid through the surface takes place, congealing the liquid and freezing the sheet to the surface. In this way, an ice layer or sheet is built up on the freezing surface. As I pointed out in my patent, No. 1,480,382, I prefer to accomplish this freezing on a surface which is maintained constantly deflected and accordingly in the present embodiment when the machine is operated to permit under-flow or under-freezing, I prefer to control the deflection of the cylinder in such a way as to maintain it in a state of constant deflection.

This mode of operating my apparatus to cause under-flow or under-freezing will be described in greater detail hereinafter.

Alternatively the deflecting means may be controlled by hand for producing flakes of any thickness desired by the operator. This deflecting mechanism in its illustrated embodiment will now be described.

In Figures 6 and 8 the deflecting means or ways are shown as a plurality of rollers 206 loosely mounted upon the shafts 208 and held in the required axial position thereon by fixed rings 210 on the ends of the shafts, washers 212 between the roller hubs and supporting sleeves 214 carrying the shafts. There are (Figure 8) four such shafts 208 and four sets of rollers.

The rollers of each set are formed with flanges 216 normally spaced slightly from but adapted at certain times to operate upon the thickened portion of the cylinder joint strips 56 and end aprons 60. The rollers are designed to have radial movement for pressing the cylinder outwardly across its entire width at four circumferentially spaced points as it passes thereover thus changing it progressively from a cylinder to an approximately quadrilateral figure having four principal surfaces (between rollers) having a supernormal radius of curvature joined by four smaller surfaces (over the rollers) having a subnormal radius of curvature.

From the above it is clear that the rollers or ways 206 are capable of deflecting the cylinder uniformly across its entire width. In this connection the aprons 60 which are employed for driving and supporting the cylinder 46 by means of the heads 44 co-operate with the deflecting rollers or ways 206 to permit the cylinder to be deflected uniformly across its entire width, by permitting radial movement between the cylinder panels 56 and the heads 44.

For producing this radial movement of the rollers the shaft-carrying sleeves 214 are formed integral with slides 218 operating upon radial guide rods 220 affixed at their inner ends to the hubs 194 of the spiders 190 previously described. The slides 218 are spread or retracted by links 222 pivoted thereto at their outer ends and pivoted to arbors 224 at their inner ends. The arbors 224 are positioned within the tube 110 and have axial movement which is translated by the links 222 into radial movement of the slides, the action being analogous to the opening and closing of an umbrella. It is necessary, therefore, to provide longitudinal slots 226 in the tube 110 for passage and movement of the links 222. The links may be initially adjusted as to length by provision of an externally threaded stem portion 222a entering an enlarged internally threaded socket portion 222b. This adjustment provides one of the means by which it is possible to control or vary the amount of deflection of the cylinder wall caused by the rollers 206 for purposes to be described hereinafter.

Within tube 110 the axially slidable arbors 224 (Figure 6) are fixed upon a reciprocatory deflector rod 228 guided for longitudinal movement within tube 110 by the plug 172, previously mentioned, and guided at the left end by a stuffing box 230 (Figure 5) formed on the outer side of the T-coupling 152 into which the left end of tube 110 is threaded. The stuffing box 230 is provided with rod packing held in place by a gland 234 and the plug 172 is provided at the right end with rod packing 232.

Means is provided for producing reciprocatory movement of the deflector rod 228. As best shown in Figure 11 but shown also in Figure 3, the outer end of deflector rod 228 is provided with vertically aligned stud pins 236 each taking into the end of a split lever 238 which is pivoted intermediate its ends upon an apertured block 240 adjustably held on an eye-bolt 242 by adjusting nuts 244. The eye-bolt 242 is pivoted between spaced lugs 245 integral with the T-coupling 152. The other end of the split lever 238 is pivoted to the left end of an axially reciprocable bar 246 supported intermediate its ends between rock arms 248 pivoted upon the tube 110 by set screws 250. If the bar 246 is moved to the right it will move the deflector rod 228 to the left to move the rollers 206 radially outward and if the bar is moved to the left it will move the rod 228 to the right to move the rollers radially inward.

This connection between the bar 246 and the deflecting rod 228, affords a second adjustment for controlling or determining the amount of deflection of the cylinder wall caused by the rollers 206.

As herein illustrated cams and associated mechanisms are employed for imparting properly timed endwise movement to the bar 246 and the deflector rod 228. The cams are shown in Figures 3, 5 and 11 to comprise a retracting cam 252 attached to the outer side of the flange of the left packing gland 126 and a distending cam 254 attached to the inner side of this flange.

Since the deflector mechanism tends to remain in its retracted position, the retracting cam 252 (Figure 5) is formed merely with an axially inclined ramp face extending over about half of a revolution. In operation, the cam carries its follower axially past the high point of the ramp there to stay until such time as it is moved in the opposite direction.

On the other hand, the deflector mechanism when distended tends to return to retracted position due to the resiliency of the cylinder; hence the distending cam 254 (Figures 1, 3 and 5) is formed with an axially inclined ramp 254a which extends over about one revolution and which flattens out at its high point into a level annulus 254b set back below the bottom wall of the ramp. A follower if urged toward the axis of rotation of the cam will ride up the inclined ramp, being moved axially to the right by this action, and upon reaching its apex will move inwardly upon the flat annulus and thereafter rides upon the flat annulus until released.

The parts for operatively connecting the shaft cams 252, 254 to the bar 246 are as follows. As shown in Figures 11 and 12 the reciprocatory bar 246 is provided with spaced transversely moving cam followers 256, 258 operating in guides 260 fixed to the bar 246, each follower carrying a loose cam roller 262 and the one—256—cooperating with the retracting cam 252 while the other, 258 cooperates with the distending cam 254. The followers 256, 258 are provided with slots 264 receiving the rounded ends of a rocking lever 266 pivoted centrally upon a clip 267 attached to the bar 246, the lever in turn being keyed to and oscillated by a rock shaft 268 associated with suitable timing mechanism.

When the shaft 268 is turned in one direction it causes one of the followers 256 or 258 to be pressed toward its associated cam and when turned in the other direction it withdraws the one follower and causes the other to be pressed toward its associated cam, engagement of the cam followers with their cams causing the bar 246 to be reciprocated either to the right or to the left.

In Figure 11 the rock shaft 268 is seen to be operatively connected to a lower rock shaft 270 through a torque spring 272 provided with a cuff 274 at its upper end rigidly attached to the shaft 268 and with a castellated coupling 276 at its lower end meshing with a similar castellated coupling 278 adjustably fixed to the shaft 270 by a set screw 280. The coupling 278 may either be moved up and attached to the shaft 270 so as to mesh with coupling 276, as shown in the several views for power operation of the shaft 268 and the cam followers, or it may be moved down the shaft out of mesh with the coupling 276 for manual operation of the shaft 268 and the cam followers. A handle 282 is provided on the coupling 276 for manual operation.

From the foregoing it is clear that when the coupling 278 is moved down and out of mesh with the coupling 276, the rollers 206 may be set for permanent deflection of the cylinder walls in the following manner: While the cylinder 46 and the stub shaft 40 are rotating, the handle 282 connected through the torque spring 272 to the lock shaft 268 is moved counterclockwise, thereby forcing the cam follower 258 into the path of the distending cam 254. With this operation the cam follower 258 rides up the axially inclined ramp of the distending cam for one revolution of the stub shaft 40 until it reaches the end of the ramp 254 whereupon continued counterclockwise pressure on the handle 282 forces the cam follower 258 onto the flattened level annulus or cam 254b. The handle 282 is now released, leaving the cam follower 258 in its forward position and in contact with the annulus 254b. It is thus clear that the lever 246 has been moved to the right with this operation (Figure 1) and is held permanently at its right hand position by the cam and cam follower and that the deflector rod 228 has been moved to its left hand position, thereby forcing the deflecting rollers 206 into their deflecting position to cause a constant state of deflection of the cylinder wall as it rotates.

As hereinbefore pointed out, when the apparatus of the present embodiment is operated to permit under-flow or under-freezing, it is preferable to maintain the cylinder walls under constant deflection. As pointed out in my patent, No. 1,480,382, the deflection of the walls is preferably obtained by adjusting the deflecting rollers (in the present embodiment, rollers 206) so that they exert the desired pressure against the cylinder wall at diametrically opposite points to obtain the desired constant deflection thereof. In the present embodiment this desired pressure is obtained by following the same procedure, i. e., by adjusting the toggle mechanism 222 and the connection between the lever 246 and the deflecting rod 228. Then by moving the cam follower 258 into contact with the cam 254b (as hereinbefore described) the rollers 206 are moved into deflecting position. Now, when the cylinder 46 is rotated while submerged in the liquid being frozen, and the refrigerating agent is circulated through the cylinder, each unit portion of the wall is flexed from its normal confirmation four times during a complete revolution of the cylinder.

As described in my patent, No. 1,480,382, with this deflection, it will be understood that a limited section of the cylinder wall, as it approaches each of the pressure rollers or ways 206, is deflected and separates from the inner face of the ice layer, thereby providing a space between the ice layer and the wall extending across the entire width of each panel of the cylinder and open at its opposite ends so that water in the tank may enter between the ice film and the flexible cylinder wall. Thus there is continuous contact of the water directly with the wall of the cylinder adjacent each roller and consequently an immediate transfer of heat from the water entering the space. As the cylinder continues to rotate at least a part of this water is converted into ice crystals which are added to the ice layer on its inner face, and which bind the separated ice layer to the cylinder wall.

As this limited section now passes over the next successive roller, the under-freezing process is repeated; and so on at the successive rollers until the ice sheet forming on the wall becomes so inflexible as compared with the degree of deflection of the cylinder wall that the separation between the ice sheet and the cylinder wall becomes too great to permit the under-flow or under-freezing, and the ice sheet peels from and is projected from the panels of the cylinder in successive elongated symmetrical sheets or strips.

Summarizing this mode of operation in another way, I position the ways 206 to cause the cylinder wall 46 to travel about a predetermined path, the path being such that as the cylinder wall passes over a portion thereof, congealing of the liquid on the cylinder wall takes place without a complete separation therefrom. However, over the remaining portion of the path, the cylinder wall is so deflected that the ice peels therefrom in sheets.

When the apparatus of the present invention is operated to permit under-flow or under-freezing, according to the manner described in my patent, No. 1,480,382, new and useful results are obtained not obtainable with the apparatus shown therein. For example, with the present apparatus in which each panel or sheet 54 of the cylinder 46 is deflected uniformly across its entire width by the deflecting rollers 206, the sheets or strips of ice formed on the respective panels 56 are separated and peeled from the panels without any breakage along the longitudinal axis of the sheets. Further, by constructing the cylinder 46 to provide parallel peripheral insulating areas between the panels 56, the sheets of ice formed on the panels have parallel edges. Thus, the successive ice sheets peeled from the panels, when the cylinder is operating under freezing-under conditions, are substantially symmetrical with respect to each other and have at least two parallel edges.

However, the cylinder construction and the deflecting mechanism as disclosed in my patent, No. 1,480,382, is such that the cylinder wall is not deflected uniformly across its width. The deflecting mechanism causes the cylinder wall to be deflected more in the central portion thereof than in the side or end portions thereof, thereby causing a bulge in the central portion. Consequently, when the apparatus described in my aforementioned patent is operated to permit freeezing-under the ice sheet formed on the cylinder is materially fragmented along its central and other portions, and the ice does not come off the cylindrical wall in the form of successive symmetrical elongated sheets, but in the form of irregular fragments varying not only in surface area but in thickness due to the fact that the non-uniform flexing of the cylinder sometimes causes incomplete freeing of the ice leaving some portions on the cylinder.

Under certain other conditions of operation, I may prefer to form an ice layer on the cylinder while the cylinder wall is not deflected and then subsequently change the path of the cylinder to deflect the walls sufficiently to cause the ice sheet formed thereon to crack and peel from the cylinder. For this purpose the aforementioned timer mechanism is employed which comprises, as shown in Figures 11, 13 and 14, a cam disc 284 rotatably mounted within a casing 286 (attached to gear casing 90) and constantly driven by a worm 288 on the outer end of the low speed shaft 88, previously mentioned. This shaft with its worm exposed is also shown in Figures 1 and 5. The shaft 270 is provided with a spherical enlargement 271 operating in a similarly shaped bearing in the casing 286 and at its lower end carries an arm 290 supplied with a cam stud 292 operating in a cam groove 285 formed in the upper face of the disc 284. The cam groove includes a relatively long inner retracting portion 285a and a relatively short outer distending portion 285b.

By the construction just described it is apparent that the retracting cam follower 256 is pressed against its associated retracting cam 252 and the bar 246 is held toward the left for a relatively long period of time while the cam stud 292 is riding within the long retracting portion 285a of the cam groove 285 and that the distending cam follower 258 is periodically pressed against its associated distending cam 254 and the bar 246 is held toward the right for a relatively short period of time while the cam stud 292 is riding within the short distending portion 285b of the cam groove 285; that the torque spring 272 and the universal bearing provided for the lower shaft 270 maintain an operative connection between the parts in all positions of the bar 246; and further that the mechanical timing mechanism may be completely disconnected and the action of the deflecting mechanism timed by hand.

*Heat insulation and ice scrapers for heads of cylinders*

In the operation of the machine there is a tendency for ice to form on the outer faces of the cylinder heads 44 and this ice might eventually build up until it filled the spaces between the rotary heads and adjacent stationary parts. Further, there is a tendency for ice to form upon the end aprons 60 of the cylinder where they are attached to the heads 44 on account of the small amount of flexing imparted to the aprons adjacent these fixed lines of attachment. Formation of ice over the aprons would still further decrease their permissible flexing and impair the efficiency of the machine. Means is herein provided for avoiding these difficulties so as to keep the machine in proper operating condition for any length of time it may be used.

In Figures 5 and 6 each cylinder head 44 is seen to be equipped on its inner face and beneath the end apron 60 with a plurality of discs 294 of heat insulating material such as sponge rubber, beveled on their outer edges to form a flexible seal with the apron in all of its movements. The discs may be held in position by a metal shield 296 and screws 298 entering threaded holes in the head.

There is also a slight tendency in spite of the insulating discs 294 and further hub cuffs 295 for cold to travel along the hub 45 of the cylinder head and form ice on the outer surface of the head near its axis. This formation of ice takes place quite slowly and may conveniently be removed with scrapers.

Referring to Figures 5 and 10 the flange of packing gland 50 is provided with radially inclined ice scrapers 304 and 306 facing the end of the rotatable cylinder head. The leading scraper 304—considered with respect to the direction of rotation of the cylinder head—is serrated to cut concentric grooves in the ice while the trailing scraper 306 has a straight edge to shave off the ridges left between grooves. By operating in this manner it has been found that the ice formation can be removed with much less expenditure of power than if either serrated or straight scrapers alone were used.

*Air vent for cylinder*

Due to the constant presence of air in most bodies of fluid there is a likelihood of the top of the closed cylinder becoming the collection point for a body of air which would prevent brine from contacting the entire interior surface of the cylinder and hence reduce the efficiency of the machine. To forestall this (Figures 5 and 8) a flexible air vent tube 308 is provided and has an opening near the upper inner surface of the cylinder where air would collect for conducting it out of the cylinder in any suitable way.

As shown, the tube 308 embraces the end of a nipple 310 screwed into the deflector rod 228 and operating within a slot 311 in the tube 110. The rod 228 is formed with a small bore 312 for conducting the air to the left end of the rod where it may be withdrawn by a hand cock 314, clearly shown in Figures 3 and 4.

Ice collection

Ice removed from the cylinder and floating to the surface of the water in the tank may be removed in any approved manner. The mechanism herein provided for this purpose is shown in Figures 1, 4 and 5, and comprises spaced endless flexible members such as conveyer chains 320 carrying blades 322 and passing obliquely from sprockets 324 on a lower shaft 326 to sprockets 328 on an upper shaft 330. The blades 322 beneath the lower shaft dip below the surface of the water and gather ice ahead of them pushing it up an inclined drainage ramp 332 over the upper edge of the tank and pass it to a discharge chute 334.

The ice peeling from the cylinder 46 may be broken into fragments by the blades 322 and/or by falling from the chute 334 to a storage bin or other receptacle for the ice flakes. The ice flakes formed by the breaking of the successively formed symmetrical sheets when under-flow freezing is employed, as hereinbefore described, break into curved fragments which have a greater uniformity in size and shape than fragments formed from nonsymmetrical sheets, and hence are better adapted to various commercial purposes than the less nearly uniform fragments resulting from the older methods previously described.

The ice fragments thus produced, when stored or packed, remain loose and free-flowing, for, due to their intrinsic shape, they contact with each other only over limited areas. Consequently they do not tend to congeal together.

The shafts 326 and 330 are mounted in bearings carried by transverse inclined beams 336 and the latter shaft is driven from the jack shaft 80 by a belt 338 passing over pulleys 340 and 342 fixed to the shaft 330 and the jack shaft respectively.

Water regulation

Since the body of water in the tank is constantly being used up in the formation of ice which is removed it is necessary to replenish the supply and it is desirable that the additional water be added gradually and constantly so that the water level in the tank may remain substantially the same at all times.

As shown particularly in Figure 5 water is supplied at the top of the tank by an inlet pipe 344 controlled by a float controlled valve 346, a well being provided for the float if desired to protect it from contact with floating ice.

At another point near the top of the tank an overflow pipe 348 is located and at the bottom of the tank a drain cock 350 is adapted to remove all the water from the tank when desired.

The operation of the machine will be apparent from the foregoing description without further amplification. The machine in operation makes ice much more rapidly and efficiently than is possible with the usual types of ice making machines. Further the machine may be operated for long periods of time without breakage or without stoppage for any reason. Ice can be made by the machine in suitable form for immediate use avoiding the usual waste of time and ice entailed in shaving or cracking smaller pieces from a large block.

While one specific embodiment of the invention has been described with particularity it is to be understood that the invention is not meant to be limited thereby but may have numerous other embodiments within the scope of the appended claims.

I claim:

1. A product of manufacture comprising substantially symmetrical sheets of ice, each sheet being curved, relatively large in area and thin in depth, relatively elongated and of substantially constant width throughout its length whereby each sheet tends, upon first being fractured, to break into fragments which are larger and of more nearly uniform size and shape than fragments formed under the same or similar conditions from non-symmetrical and/or smaller sheets.

2. A product comprising a substantially congealed mass of material, fluid at normal temperatures, in the shape of a relatively thin, curved sheet, said sheet being substantially symmetrical whereby upon fracture it tends to form curved fragments which, when two or more lie in juxtaposition to each other, contact only in relatively limited areas and which fragments have a higher degree of uniformity in size and shape than fragments produced by the breaking of non-symmetrical sheets.

3. A product comprising a substantially congealed mass of material fluid at normal temperatures, in the shape of a relatively thin sheet having sides and edges, two of which edges are symmetrical with reference to each other, adjacent portions of at least one of said sides being out of rectilinear alignment.

4. A product comprising substantially congealed fluid, liquid at normal temperatures, in the shape of a relatively elongated, thin, curved strip of substantially constant width throughout its length, and having a free end from which fragments may be broken.

5. A product comprising a substantially congealed fluid, liquid at normal temperatures, in the shape of a relatively thin strip having adjacent portions of at least one side out of rectilinear alignment and having substantially symmetrical side edges and a free end from which fragments may be broken.

6. A product of manufacture comprising symmetrical sheets of ice, each sheet being relatively thin in depth, having substantially symmetrical edges, and adjacent portions of at least one of its sides out of rectilinear alignment.

7. A product of manufacture comprising individual pieces of relatively thin ice having only two principal exposed surfaces and materially less extensive edge portions joining said principal surfaces whereby the ratio of surface area to mass is increased to provide greater surface for heat transfer, at least one of said principal surfaces having adjacent portions out of rectilinear alignment to reduce the areas of contact between contiguous pieces, said pieces having approximately uniformity of size.

8. A product of manufacture comprising individual pieces of relatively thin ice having only two principal exposed surfaces and materially less extensive edge portions joining said principal surfaces whereby the ratio of surface area to mass is increased to provide greater surface for heat transfer, at least one of said principal surfaces being curved to reduce the areas of contact between contiguous pieces, said pieces having approximately uniformity of size.

9. A product of manufacture comprising individual pieces of ice, each piece being relatively flat and relatively thin in comparison with its lateral dimensions, the corresponding sides of individual pieces being generally similar in surface configuration, and adjacent portions of at least one side of each piece being out of rectilinear alignment.

10. A product of manufacture comprising individual pieces of ice, each piece being relatively flat and relatively thin in comparison with its lateral dimensions, the corresponding sides of the individual pieces being generally similar in surface configuration and one side of each piece being curved.

11. A product of manufacture consisting of pieces of ice formed from a continuous curved, narrow, thin strip of ice having a cross section one boundary of which is a straight line.

12. As a product of manufacture, pieces of ice broken from a strip of ice, the strip being formed thin and narrow and curved about an axis parallel to a line running the width of said strip to provide the strip with such structural characteristics as to give it a high modulus of rupture when bent along a longitudinal line of said strip and a relatively low modulus of rupture when bent along a transverse line of said strip, whereby the strip is more capable of resisting breaking along a longitudinal line of said strip, but is easily broken along transverse lines of said strip, and whereby the strip tends to break along transverse lines to provide pieces of more uniform size.

CROSBY FIELD.